April 28, 1936. G. BLAUFUSS 2,038,921
SEMICONTINUOUS SELF CLEANING FILTER
Filed Feb. 7, 1934 2 Sheets-Sheet 1

INVENTOR.
George Blaufuss.
BY Townsend & Loftus.
ATTORNEYS.

April 28, 1936.   G. BLAUFUSS   2,038,921
SEMICONTINUOUS SELF CLEANING FILTER
Filed Feb. 7, 1934   2 Sheets-Sheet 2
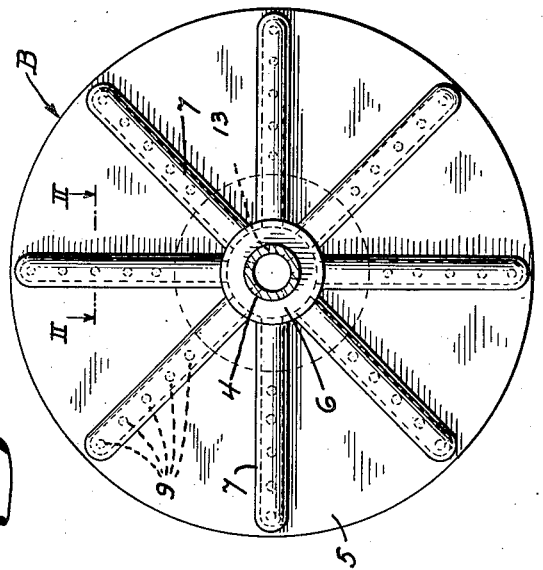
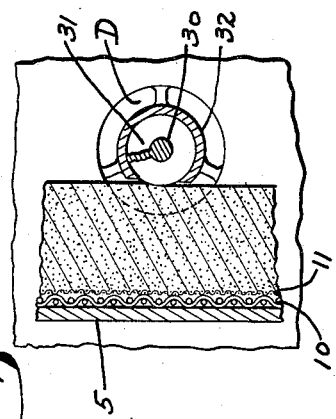
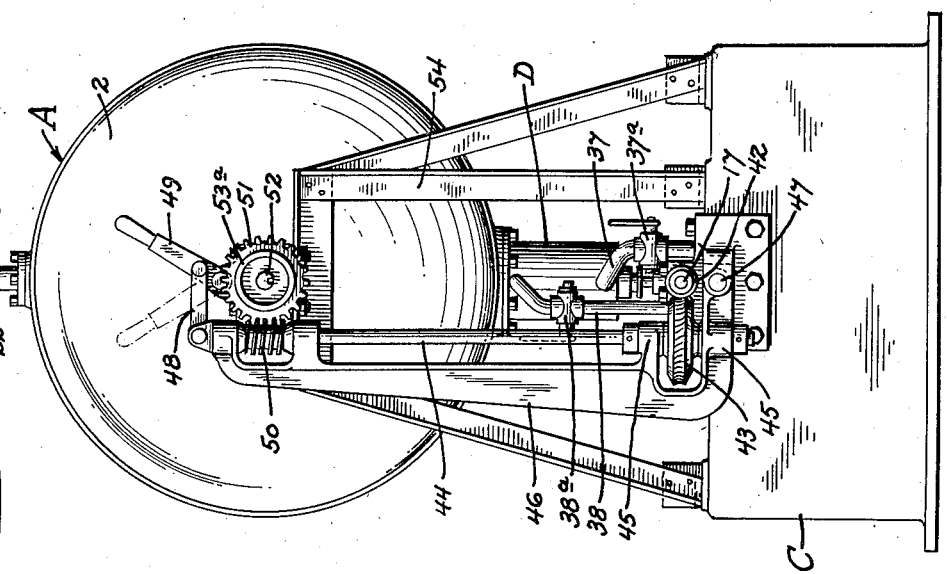
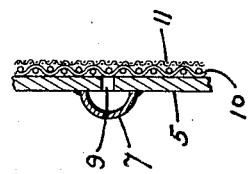
INVENTOR.
George Blaufuss.
BY Townsend & Loftus.
ATTORNEYS.

Patented Apr. 28, 1936

2,038,921

UNITED STATES PATENT OFFICE 2,038,921

SEMICONTINUOUS SELF CLEANING FILTER

George Blaufuss, Napa, Calif.

Application February 7, 1934, Serial No. 710,076

6 Claims. (Cl. 210—201)

This invention relates to filters for filtering liquid material, such as beer, wine, etc., and especially to a modification of the filter structure shown in my copending application entitled "Filter", Serial Number 673,690, filed May 31, 1933.

The filter disclosed in my copending application embodies a cylindrical shaped housing in which is mounted a rotatable filter drum. Diatomaceous earth, or a like filter medium, is deposited on the surface of the drum to form from a filter cake and the liquid to be filtered is passed through the cake. During filtration impurities collect on the surface of the cake, and if they were not removed, flow of liquid through the cake would soon cease. A rotary cutter or scraper is accordingly provided, together with manually controlled means for moving the scraper toward the surface of the cake, with the result that the impurities are removed and also a portion of the filter cake. The thickness of the cake is accordingly gradually reduced until a minimum thickness is reached when a new cake must be applied. The rate at which the cake is removed or reduced in thickness depends entirely upon the judgment or skill of the operator. This is not desirable for the simple reason that if it is reduced at too slow a rate the capacity of the filter will be reduced, the flow of discharge will fall, and so on; this being very objectionable as it may interfere with the bottling end of the plant, also some liquids are detrimentally affected by passing through impurities previously deposited.

The object of the present invention is to generally improve the operation of filters of the character described; to provide means whereby the removal of impurities and the gradual cutting or scraping away of the filter cake is automatically accomplished so as to maintain a constant flow and a clean filter bed or surface at all times for the incoming liquid, and more specifically stated to provide a filter unit capable of being automatically moved toward the cutter or scraper.

The filter is shown by way of illustration in the accompanying drawings, in which—

Fig. 2 is an enlarged cross section taken on line II—II of Fig. 3.

Fig. 3 is an end view of one of the filter units.

Fig. 4 is an enlarged cross section taken on line IV—IV of Fig. 1, and

Fig. 5 is an end view showing the manner in which the gears are released or disconnected when the filter units are to be returned to starting position.

Figure 1:
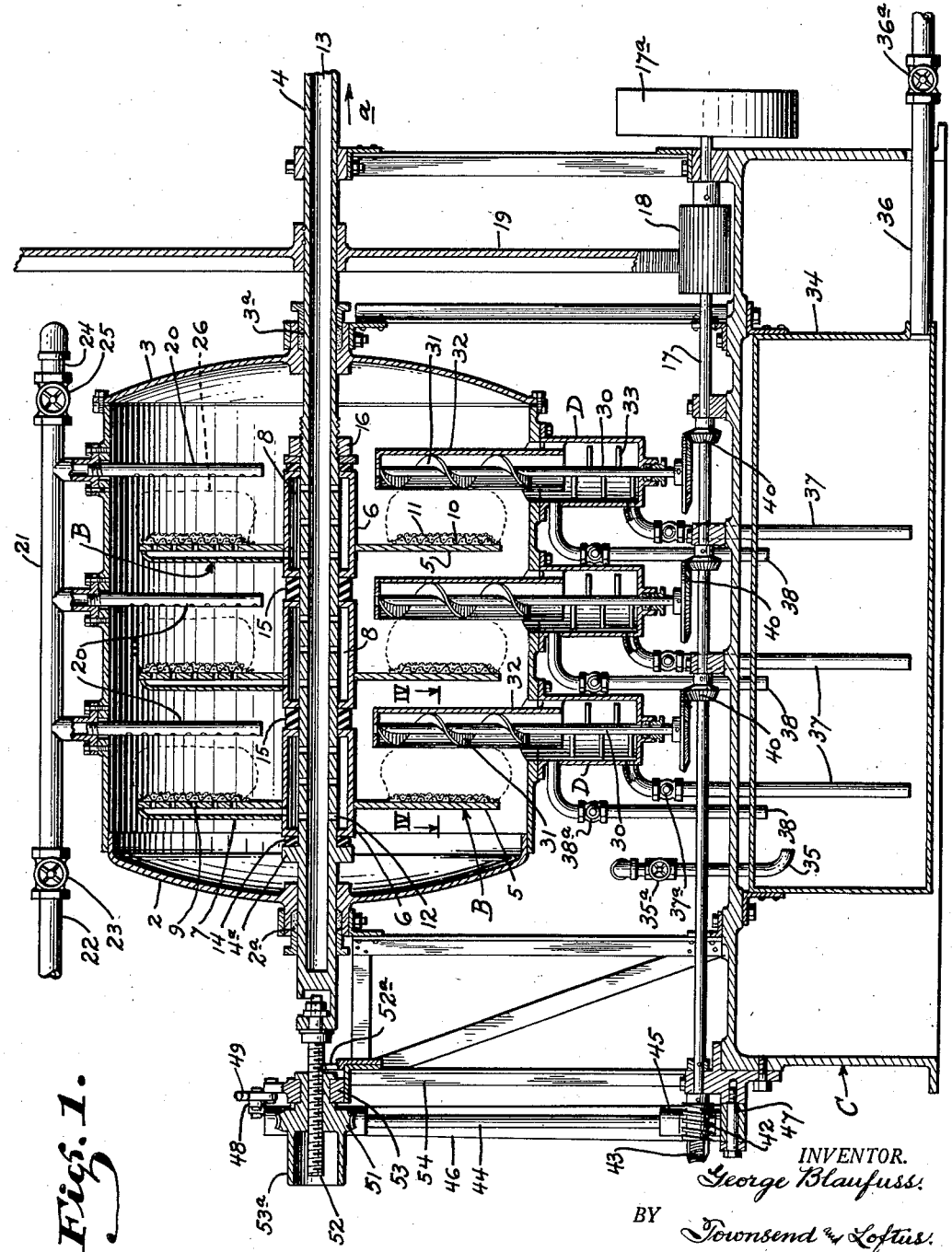
Fig. 1 is a central vertical longitudinal section through the filter.

Referring to the drawings in detail, and particularly Fig. 1, A indicates a cylindrical-shaped elongated casing provided with head members 2 and 3 at opposite ends, both or either of said head members being removable. Formed in the respective head members are combination bearings and stuffing boxes, such as indicated at 2a and 3a, and journaled therein and extending longitudinally through the casing A is a tubular shaft 4. Mounted on the shaft are one or more filter units generally indicated at B. These units are identical in construction and the description of one will suffice.

Having reference to Figs. 1, 2 and 3, it will be noted that each filter unit consists of a back plate 5 secured to or cast integral with a hollow hub member 6. A plurality of hollow or tubular arms 7 radiate from the hub and communicate with the annular space 8 formed within the hub, and a plurality of perforations 9 are made in the front face of plate 5 to form communication with the outer ends of the arms. Suitably secured on the plate 5 is a coarse wire mesh screen 10 and covering the same is a fine mesh screen or cloth 11. The cloth 11 forms a filter surface upon which a filter cake is applied, as will hereinafter be described, while the coarse wire mesh 10 forms a spacer between the cloth 11 and the plate 5 so as to permit any liquid passing through the cloth 11 to flow freely through the perforations 9 in the arms 7 and then to flow inwardly through said hollow arms into the space 8 of the hub member and then through perforations 12 formed in the shaft 4, and finally to discharge through the hollow shaft at the point indicated at 13.

The several filter units indicated at B are endwise removable with relation to the shaft 4 for purposes of cleaning, inspection, repair, etc. A fixed collar 4a is secured on the shaft and a rubber gasket 14 is interposed between this collar and the hub of the first unit B. Rubber gaskets or washers 15 are interposed between the hubs of the remaining units and a nut 16 screwed on the shaft 4 is employed at one end to force the units tightly together, thereby compressing the gaskets between the hub members and preventing leakage. This also secures the units against rotation an important feature as the filter units will rotate slowly with shaft 4 during the filtering operation.

The casing A may be suitably supported with relation to a base member C. This member carries a drive shaft generally indicated at 17. An elongated pinion 18 is mounted on the shaft and this intermeshes with a large gear 19 secured on shaft 4. The drive shaft may be driven from any suitable source through means of a pulley 17a, or the like, and as the reduction between the gears 17 and 18 is very large shaft 4, together with the filter units B secured thereon, will be slowly rotated; in fact, the rotation must be sufficiently slow to prevent agitation within the casing A when the filter is in operation. The liquid to be filtered enters the casing through a series of perforated pipes 20 which are connected with the manifold 21. One end of the manifold is connected through a pipe 22 with a pump, not shown, which delivers the liquid to be filtered under pressure. A valve 23 is provided for shutting off the flow whenever required. The opposite end of the manifold is connected with a pipe 24 and a valve 25 and the filter medium which forms the filter cake hereinafter to be described is delivered through this connection, a pump, or other suitable means, being provided for delivering a mixture of liquid and diatomaceous earth, or the like, through the connection 24 and valve 25, and then through manifold 21 and pipes 20. When such material is being delivered and shaft 4 and the units B are slowly rotated, a filter cake such as indicated by dotted lines at 26 will form on the surfaces of the respective units, and when a cake of desirable thickness has been formed valve 25 is closed and valve 23 opened. The beer or other liquid to be filtered will then enter the manifold 21 through pipes 20. It will be uniformly distributed by these pipes and directed toward the filter cakes. It will then pass through these cakes and through the hollow arms 7, and finally discharge through the hollow shaft 4. Liquids to be filtered naturally carry impurities in one form or another and such impurities collect on the surface of the cake. Such impurities must be gradually removed as they would otherwise clog the filter and they must also be removed because some liquids are detrimentally affected by passing through impurities previously deposited.

In the present instance means are employed for not only removing the impurities but also for gradually cutting away the surface of the filter cake so that a clean filter bed is presented at all times. This is accomplished as follows: By referring to Fig. 1 it will be noted that the lower portion of the casing A is provided with a series of mud drums generally indicated at D. A shaft 30 extends through each mud drum and upwardly into the casing A. Secured on the upper end of each shaft is a helical cutter or scraper 31, and partially enclosing the same is a tube 32. The side of the tube toward the filter cake is open to permit a portion of the helical cutter to extend therethrough, and this projecting portion of the helical cutter engages the surface of the filter cake and as such not only removes the impurities collecting thereon but also a portion of the filter cake itself, as longitudinal movement is imparted to the shaft 4 and the filter units mounted thereon when the filter is in operation, the longitudinal movement being in a direction toward the helical scrapers or cutters as will hereinafter be described.

The upper ends of the tubes 32 are closed, as shown, while the lower ends are open and communicate with the mud drums D. Secured on the shaft 31 below the tubes 32 are agitating fingers or arms 33 and disposed below the mud drums is a collecting chamber or tank 34 into which the mud or impurities is directed, the impurities collected being removed from time to time through pipes 35 and 36. These are each provided with valves as shown at 35a and 36a. When the valves 35a and 36a are opened air under pressure will be admitted through pipe 35 and the mud or impurities collected will be discharged through pipe 36. The mud or impurities removed by the helical cutters 31 discharges from the lower ends of the tubes 32 into the drums D. The mud is here agitated and maintained in a semi-liquid or plastic condition by the agitating arms 33 and the mud is discharged from the lower ends of the drums D through pipes 37 which communicate with the collecting tank 34. Return pipes 38 are also provided and both the delivery and return pipes are provided with valves, as shown at 37a and 38a, these valves being closed when the valves 35a and 36a are open so that the contents of the mud drums D and the main casing A shall not be disturbed or in any manner agitated. The shafts 31 extending through the mud drums are all driven in unison and at the same speed through bevel gears, such as shown at 40, from the drive shaft 17, and a worm gear reduction drive is provided at the end of shaft 17 for the purpose of imparting longitudinal movement to the shaft 4 and the filter units B mounted thereon. This is accomplished as follows:

Secured on the end of shaft 17 is a worm gear pinion 42 which intermeshes with a worm gear 43, see Figs. 1 and 5. The gear 43 is secured on a shaft 44 and this is journaled in bearings 45 formed on the bracket arm 46. The lower end of the bracket arm 46 is pivoted at 47. The upper end of the bracket arm is connected through a link 48 with a release lever 49. The upper end of shaft 44 is provided with a worm gear pinion 50 and this is adapted to intermesh with a worm gear 51 which is mounted on a threaded extension 52 of shaft 4. The worm gear 52 is furthermore journaled in the bearing 53 which is supported on an end frame 54. The inner end of the threaded shaft extension 52 is rotatably connected with the end of shaft 4 so as to permit shaft 4 and the filter units B carried thereby to rotate independently of the extension shaft 52. Shaft 52 is secured against rotation by a splined connection 52a carried by the bearing 53, hence when rotary motion is transmitted to the worm gear 51 this will function as a nut and will impart longitudinal movement to the shafts 52 and 4, and the filter units will thereby be moved gradually and slowly and at a uniform rate toward the helical cutters.

In actual operation assuming that a filter cake of proper thickness has been built up on the units B and that beer or other liquid to be filtered is being admitted through pipe 22, manifold 21 and pipes 20, the liquid thus admitted will pass through the filter cakes in the hollow arm 7, and will finally pass through the space 8 of the hub member and through the perforations 12 in the shaft 4, and will finally discharge at the point 13 from the same. During this flow of the liquid to be filtered the units B in shaft 4 are slowly rotating due to the gear drive shown at 18 and 19. The helical cutters are at the same time slowly rotating and as such will remove the impurities collecting on the surface of the cake and will discharge such impurities into the drums D and through pipes 37 into the collecting tank 34. This tank will obviously be filled with liquid when the operation first commences and as the mud enters through the pipes 37 the liquid will have to be displaced, hence the return pipes 38. This is a desirable feature as it promotes circulation through the mud drums and the pipes 37 and 38. During the slow rotation of the filtering units shaft 4 is also being moved longitudinally in the direction of arrow a through the reduction worm gear drive disposed at one end thereof. The movement is, of course, exceedingly slow. It may, for instance, take several hours before the filter cakes have been cut down to a point where it is necessary to rebuild the same.

The main objection to most filters in general use at the present time is that the incoming liquid is at all times passing through impurities deposited by liquid preceding it. This is very objectionable with certain liquids and is entirely overcome in the present instance as the helical cutters provide a clean filter bed or surface at all times for the incoming liquid. This is of further importance as it insures a constant capacity of discharge from the filter and it promotes or lengthens the cycle of filtration by providing means for automatically reducing the thickness of the cake. A uniform operation is insured and a skilled operator or attendant can be entirely eliminated.

Impurities which have a tendency to contaminate the incoming liquid are being continuously removed and discharged from the lower portion of the drum while the liquid to be filtered is entering the upper portion, thus separating the two and further preventing contamination. When the shaft in the filter units B have advanced in the direction of arrow $a$ a predetermined distance the filter cakes will be reduced in thickness to such an extent that the building up of a new cake will be necessary. This is accomplished by shutting off valve 23 and stopping the drive through the shaft 17. Release lever 49 is grasped and swung from the full line position to the dotted line position shown in Fig. 5. By so doing, gears 50 and 51 are thrown out of mesh leaving the gear 51 free to be manually rotated. An extension sleeve or collar 53a is provided and by grasping this and rotating it manually shaft 4, together with the filter units carried thereby, is quickly returned to starting position and when returned the gears 50 and 51 are again thrown into mesh on the lever 49. At that point valve 25 is opened and a new filter cake can be built up as previously described, and when that is accomplished, valve 23 is again opened and power applied to shaft 17 when the filter will again be operated.

The blowing off or removal of mud from the tank 34 may be accomplished at any time but if the capacity of the same is sufficiently large it may be accomplished at the time the new filter cake is being applied, hence losing little, if any, time between filtering cycles.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a filter of the character described a casing, a tubular shaft extending into the casing and journaled to rotate therein and a filter unit secured on the shaft, said unit comprising a hollow hub member embracing the shaft, a disc secured to the hub, a plurality of tubular passages formed in the disc and communicating at their inner ends with the hollow hub and the tubular shaft, the outer ends of said tubular passages communicating with perforations opening through one face of the disc, a spacer member overlying said perforations, and a filter cloth covering the spacing member.

2. In a filter of the character described a casing, a tubular shaft extending into the casing and journaled to rotate therein and a filter unit secured on the shaft, said unit comprising a hollow hub member embracing the shaft, a disc secured to the hub, a plurality of tubular passages formed in the disc and communicating at their inner ends with the hollow hub and the tubular shaft, the outer ends of said tubular passages communicating with perforations opening through one face of the disc, a spacer member overlying said perforations, a filter cloth covering the spacing member, means for depositing a filter medium on the filter cloth to form a filter cake thereon, and means for passing a liquid to be filtered through the casing, the filter cake and the filter unit and for discharging the liquid through the tubular shaft.

3. In a filter of the character described a casing, a tubular shaft extending into the casing and journaled to rotate therein and a filter unit secured on the shaft, said unit comprising a hollow hub member embracing the shaft, a disc secured to the hub, a plurality of tubular passages formed in the disc and communicating at their inner ends with the hollow hub and the tubular shaft, the outer ends of said tubular passages communicating with perforations opening through one face of the disc, a spacer member overlying said perforations, a filter cloth covering the spacing member, means for depositing a filter medium on the filter cloth to form a filter cake thereon, means for passing a liquid to be filtered through the casing, the filter cake and the filter unit and for discharging the liquid through the tubular shaft, a rotating scraper in the casing and positioned adjacent the surface of the filter cake, and means for automatically moving the filter unit toward the rotary scraper at a uniform rate to cause the scraper to gradually remove the surface of the cake to continuously present a clean filter bed to the liquid to be filtered.

4. In a filter, the combination with a filter unit adapted to support and rotate a substantially annular filter cake, of a scraper arranged radially of the filter cake and comprising a helical rotatable scraper blade engageable with the surface of said cake, a housing surrounding said scraper except at the side thereof engaging the cake to cooperate with the scraper blade to carry away material scraped from the cake, and means for moving filter unit toward the scraper to reduce gradually the thickness of the filter cake.

5. In a filter of the character described a casing, a tubular rotatable shaft extending into the casing, a hollow hub member embracing the shaft, a perforated disc secured to the hub, a plurality of tubular passages on the disc forming communication between said perforations and the hollow hub and shaft, and a filter medium overlying the disc.

6. In a filter of the character described, a casing, a tubular rotatable shaft extending into the casing, a hollow hub member embracing the shaft, a perforated disc secured to the hub, a plurality of tubular passages on the disc forming communication between said perforations and the hollow hub and shaft, a filter cloth covering the disc, and means for depositing a filter medium on the filter cloth to form a filter cake thereon.

GEORGE BLAUFUSS.